United States Patent [19]

Flies

[11] Patent Number: 4,620,088
[45] Date of Patent: Oct. 28, 1986

[54] RECEPTACLE DESIGN FOR USE WITH ELECTRONIC KEY-LIKE DEVICE

[75] Inventor: William P. Flies, Burnsville, Minn.
[73] Assignee: Datakey, Inc., Burnsville, Minn.
[21] Appl. No.: 471,424
[22] Filed: Mar. 2, 1983
[51] Int. Cl.[4] .............................................. G06K 7/06
[52] U.S. Cl. .................................................... 235/443
[58] Field of Search .............................. 235/443, 384; 340/825.31

[56] References Cited

U.S. PATENT DOCUMENTS

| | | |
|---|---|---|
| 3,641,498 | 3/1972 | Hedin . |
| 3,806,882 | 4/1974 | Clarke . |
| 3,848,229 | 11/1974 | Perron . |
| 3,859,634 | 10/1974 | Perron . |
| 4,297,569 | 10/1981 | Flies ................................... 235/443 |
| 4,326,125 | 4/1982 | Flies ................................... 235/443 |

Primary Examiner—Harold I. Pitts
Attorney, Agent, or Firm—Vidas & Arrett

[57] ABSTRACT

Receptacle for a key-like device containing an embedded electronic circuit component with leads extending to the surface of the key to form contact areas thereon. The receptacle defines a keyway in which a plurality of contact pins are positioned and spaced to correspond to the spacing of the electrical contact areas on the key. The receptacle preferably includes a head protect sleeve which functions as a guard means for the contact pins therein. The receptacle is designed to be connected with a printed circuit board by means of staked contact pins which may be arranged in a variety of predetermined patterns on the circuit board facilitating electrical connection of the receptacle contact pins to a variety of standardized electrical connectors.

30 Claims, 15 Drawing Figures

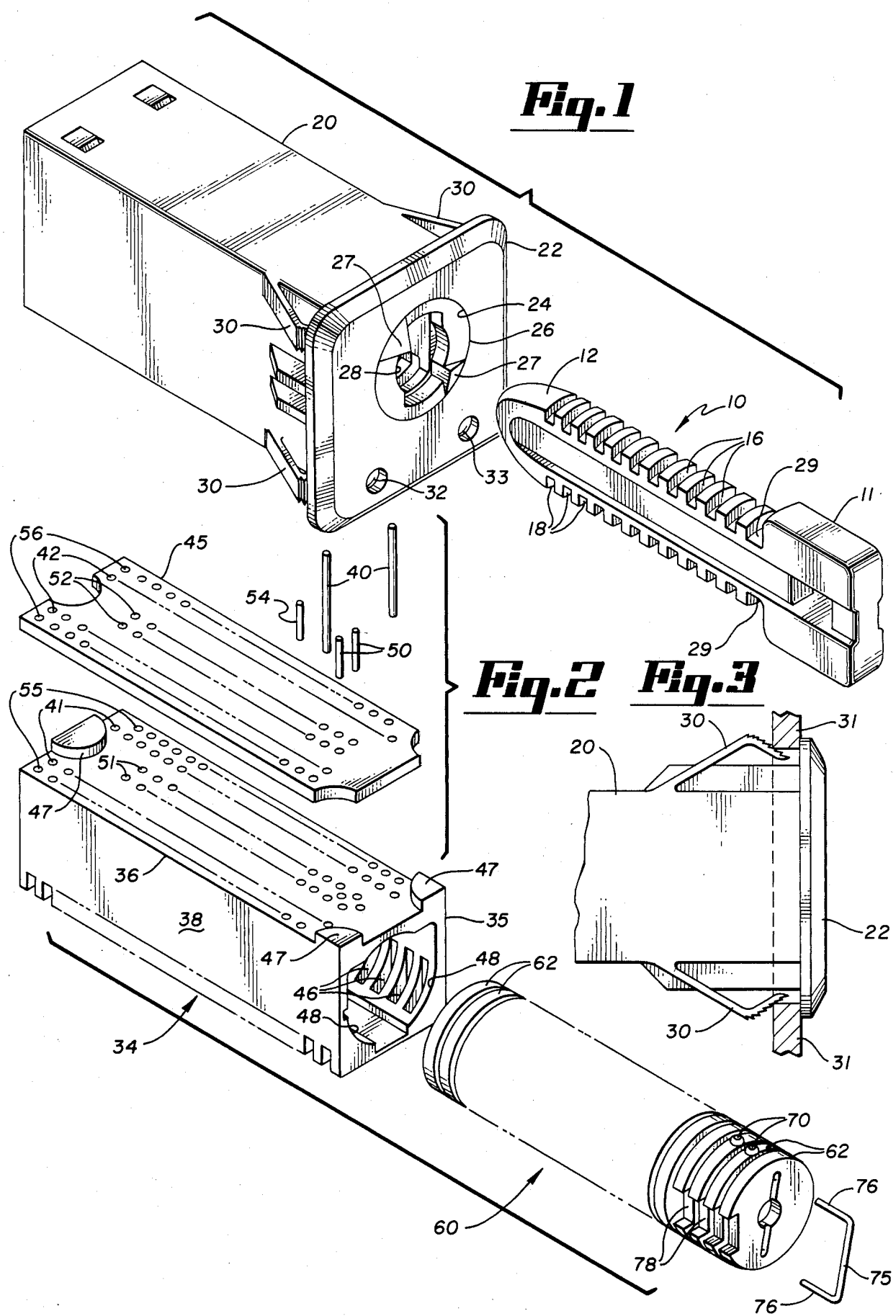

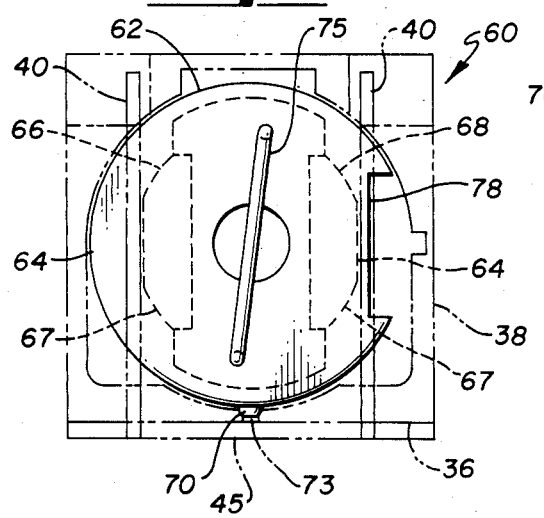
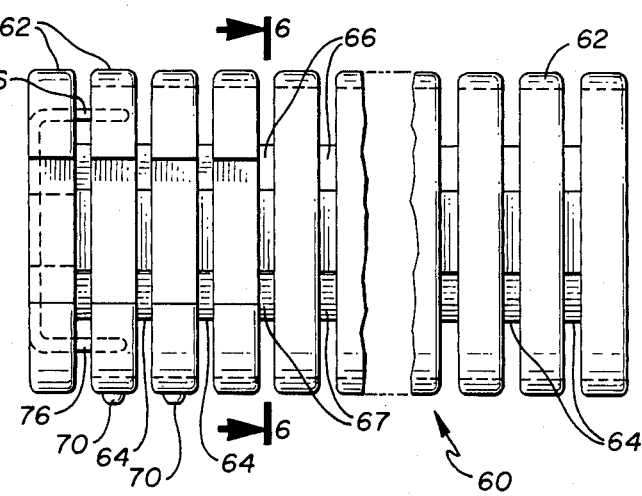
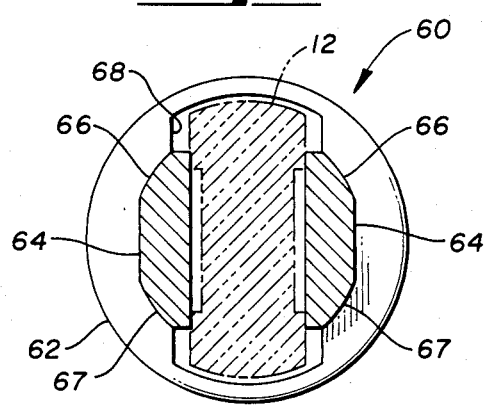
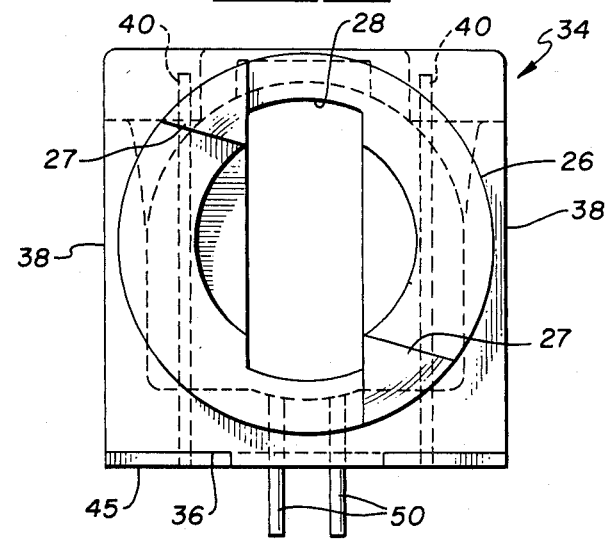
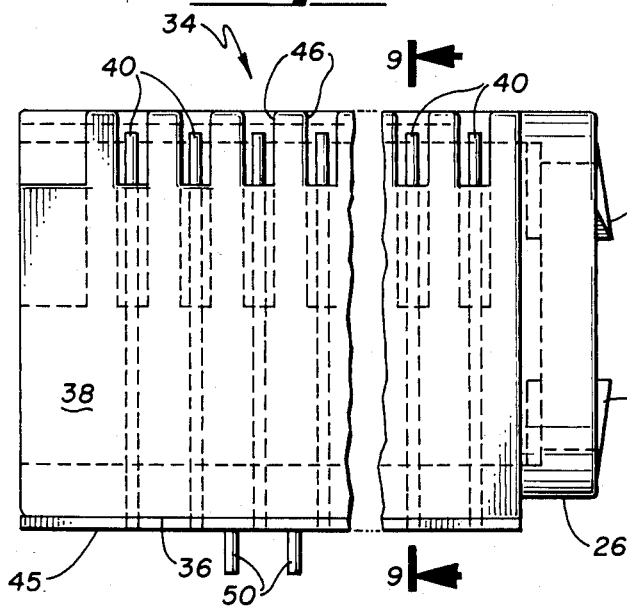
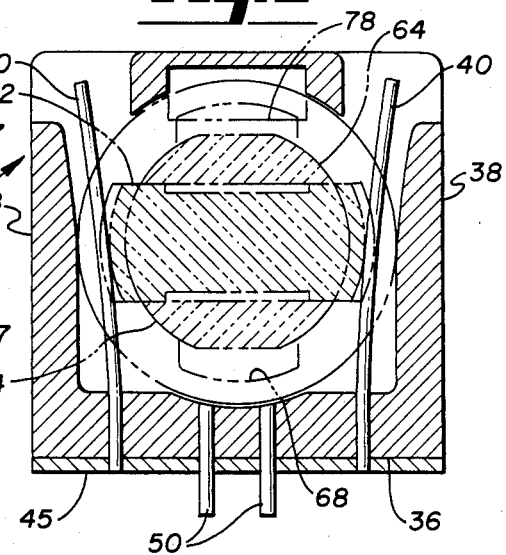

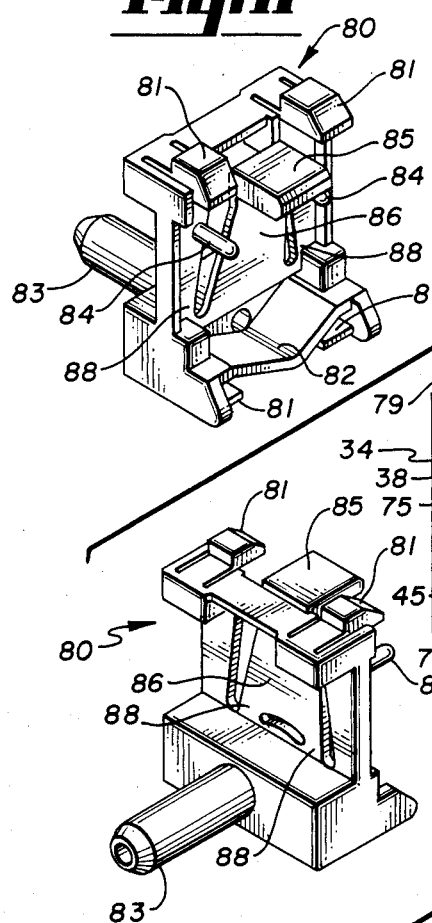
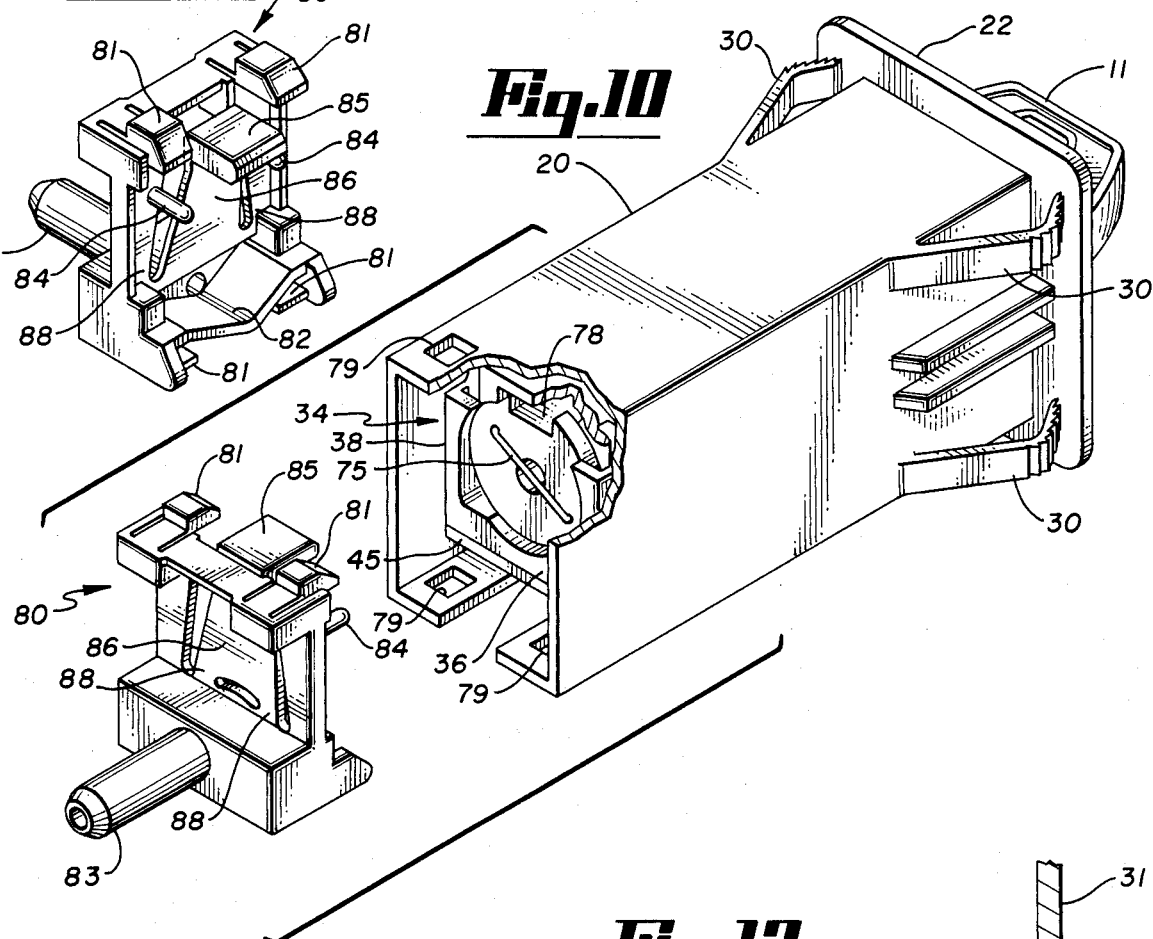
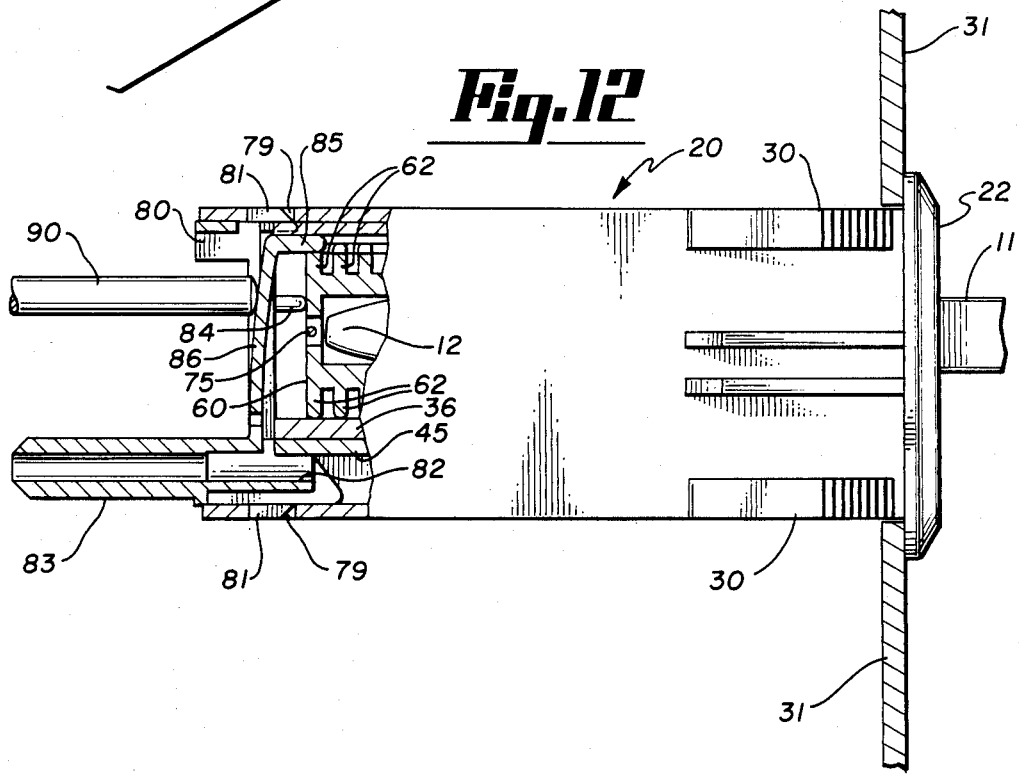

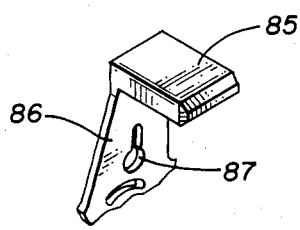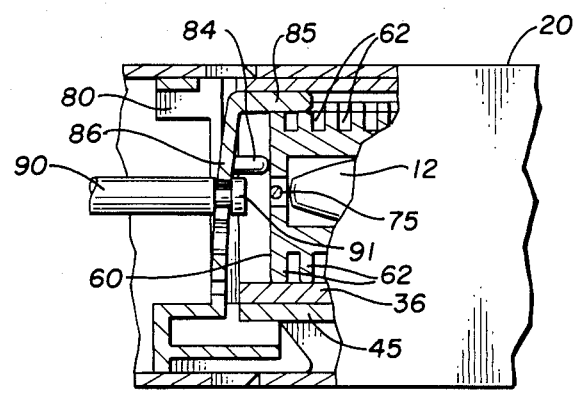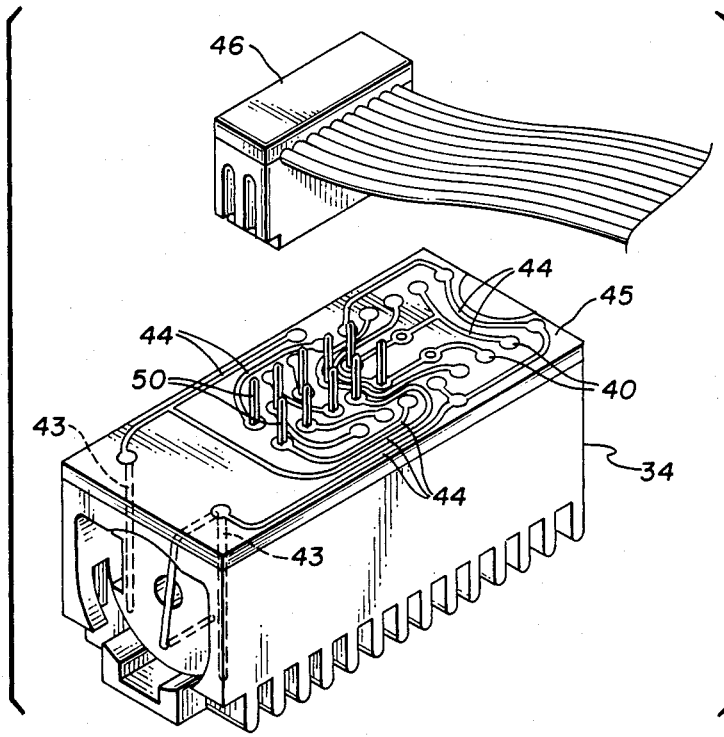

RECEPTACLE DESIGN FOR USE WITH ELECTRONIC KEY-LIKE DEVICE

BACKGROUND OF THE INVENTION

This invention relates to improvements in the functional design of electrical receptacles for use in combination with electrical key-like devices. The invention is an improvement over the inventions of U.S. Pat. No. 4,297,569, issued Oct. 27, 1981, entitled "Microelectronic Memory Key With Receptacle and Systems Therefor", U.S. Pat. No. 4,326,125, issued Apr. 20, 1982, entitled "Improved Microelectronic Memory Key With Receptacle and Systems Therefor", U.S. Pat. No. 4,379,966, issued Apr. 12, 1983, entitled "Receptacle for Electronic Information Key", U.S. Pat. No. 4,436,993, issued Mar. 13, 1984, entitled "Electronic Key", and pending application Ser. No. 343,112, filed Jan. 27, 1982, entitled "Lock Mechanism for Electronic Information Key" (now abandoned).

Electrical key-like devices have been proposed in which a master circuit or electrical operating system of some kind, such as a computer system, is activated by use of a portable device which is combined with the electrical system, as by insertion into a slot or the like, to make electrical contact or connection with the system. This invention is concerned broadly with such portable devices and with such systems. However, it is specifically concerned with a receptacle for receiving the electrical key-like devices and providing eletrical connection between the device and a computer or other master circuit operating system. As already noted, such key-like devices and receptacles therefor have been described in several patents and patent applications. The key-like devices of these aforementioned patents and patent applications retain relatively large amounts of data bits (information) in a portable medium of small size. Very fast data access and data transfer rates are provided by electric connection of such devices to a master electrical circuit means including a program memory and a processor by insertion of the key-like device into specially designed electrical receptacles. It is desirable that the receptacles have a design which provides good electrical contact with the computer, even after prolonged usage. It is also desirable that the electrical contacts in the receptacle be protected from casual damage when the receptacle is not in use. It is also desirable that the receptacle act as a buffer against static discharge into the master operating system. It is an aim of this invention to fulfill these and other objectives which will become apparent hereinbelow. It is also an objective of this invention to provide an improved receptacle design in which a printed circuit board electrically connected to the contacts inside the receptacle may be readily adapted to facilitate connection of the receptacle to standardized electrical connectors of various sizes and shapes, thereby facilitating connection of the receptacle into various operating circuits.

BRIEF SUMMARY OF THE INVENTION

The aforementioned patents and patent applications describe a key-like devices which, in the preferred form of a microelectronic data key, provide relatively large amounts of data bit storage with very fast access time while being packaged in a durable medium. The microelectronic data keys described therein are not only concerned with the storage of data (information) and its introduction into a computer or other electrical circuit, but also with the portability of microelectronic circuit chips or dies, whether the purpose of the electrical circuit system into which the key is introduced is the storage of information or any other purpose, such as a control function.

The various circuit elements which may be embedded in the key are packaged in a sturdy configuration which may be inserted into a receptacle connection to an access device or the like for a variety of purposes. Any circuit means that can be so packaged and which can augment any other existing circuit contained in the master operating system is usable in such keys. The key-like devices are specifically designed for insertion into an electrical receptacle and rotation therein to establish contact through the receptacle to the master electrical system.

The present invention relates to improvements in the design of such receptacles, the primary aim being to improved the manufacturability of the receptacles, improve the cooperation between the key-like devices and the receptacle, decrease the likelihood of physical damage to the receptacle contacts and diminish or eliminate problems created by static electricity. Additional features, such as the ready adaptation of the receptacle for connection to standardized connectors, drainage features and locking the receptacle against use by an integral latching arrangement, are included, as well as various other features.

BRIEF DESCRIPTION OF THE DRAWINGS

FIG. 1 is a pictorial view showing the receptacle of the invention mounted in its case container with an electronic key being inserted into the keyway opening.

FIG. 2 is an exploded pictorial view of the receptacle, the printed circuit board and contact pins and the head protect sleeve or receptacle contact pin guard means.

FIG. 3 is a partial top elevational view showing the receptacle case container in a mounted condition.

FIG. 4 is a distal end view of the head protect sleeve.

FIG. 5 is a side elevational view of the head protect sleeve.

FIG. 6 is a sectional view of the head protect sleeve taken along line 6—6 of FIG. 5.

FIG. 7 is a proximal end elevational view of the receptacle.

FIG. 8 is a side elevational view of the receptacle.

FIG. 9 is a sectional view of the receptacle taken along lines 9—9 of FIG. 8.

FIG. 10, 13, 14, and 15 are exploded pictorial views of the receptacle in its container case with parts broken away showing the distal end closure member.

FIG. 11 is a pictorial detail showing interior portions of the closure member.

FIG. 12 is a right side elevational view of the receptacle in its container case as mounted with parts broken away to show the latching mechanism on the cover member in a locked position.

DETAILED DESCRIPTION OF THE INVENTION

In FIG. 1, there is shown a portable random access data device or key-like device generally designated 10, and referred to hereinafter simply as the "key". Key 10 comprises non-conductive head and insert body portions 11 and 12, respectively. The insert body portion 12 contains a circuit element, such as an integrated circuit or microelectronic chip embedded therein (not shown).

Leads 16 of the circuit element extend therefrom through the body portion of the key to the upper and lower surfaces thereof where they lie exposed within spaced contact grooves 18 to form electrical contact areas on the key.

As also shown in FIG. 1, a receptacle container case, generally designated 20, carries at its front or proximate end a bezel 22 having a central opening 24 through which a receptacle flange 26 extends outwardly to form a keyway opening 28. Opening 28 is preferably a compound shape comprising a generally rectangular slot which permits insertion of the key insert portion 12 into the receptacle and a generally circular central expansion area, the diameter of which corresponds generally to the thickness of the key between grooves 29 located adjacent head portion 11 of the key. The shape of keyway opening 28 cooperates with grooves 29 so that the key may not be rotated until it is fully inserted into the receptacle. Additionally, once rotation has begun, the key may not be removed until it is returned to the insertion position.

Container case 20 includes flexible locking mount tabs 30 by means of which container 20 may be mounted in the wall 31 of a supporting structure (shown in FIG. 3), such as the face of some kind of peripheral equipment or the like. With lock tabs of the type shown at 30, the case container 20 may be merely inserted into an opening in wall support 31 until bezel 22 contacts the wall. Lock tabs 30 then lock the case container into position, as shown in FIG. 3. Bezel 22 may also include signal means at 32 and 33, such as appropriately colored LED (light emitting diodes), red and green preferred, to signal the readiness of the receptacle to receive a key and to signal operation of the system when the key has been inserted into the receptacle and turned to a contact position therein, respectively.

Referring now to FIG. 2, the electrical receptacle can be seen to be a multi-part assembly which includes an elongate housing, generally designated 34. As shown in FIG. 2, housing 34 is viewed from its distal or rear end 35 and in a position which is inverted from its normal position and use, i.e. with the base portion 36 oriented upwardly. Opposing sides 38 extend from base portion 36 to form a slotted enclosure portion which defines an elongate interior housing chamber.

The receptacle also includes a plurality of inner finger-like spring contact pins 40 which are spaced along the sides of the housing chamber, as best seen in FIG. 8. Contact pins 40 are inserted into receptacle housing 34 through rows 41 of openings (best seen in FIG. 2) and through corresponding rows of openings 42 in printed circuit board 45, which is attached to base 36 as by a suitable adhesive many of which are readily available. The pins are best inserted through printed circuit board 35 and base portion 36 of receptacle housing 34 by a staking operation using a staking machine, an operation and equipment which are well known. There is thus provided a space series of contact pins 40 inside receptacle 34 which are fixedly supported in base portion 36 and cantilever or extend through corresponding slots 46 in enclosure portion 38. Preferably these pins are of stainless steel or the Paliney ® type 6-9 or type M alloys, available from the Ney Company. Preferably, the inner walls of the interior housing chamber will include rounded or curving surfaces 48, as best seen in FIG. 2. Contact pins 40 may be soldered into the openings 42 on printed circuit board 45. Preferably, these openings will comprise standard plated barrels contacted by printed circuit pathways extending over the surface of the board (not shown in FIG. 2), as is typical in the printed circuit board art.

Connector pins 50 are staked into printed circuit board 45 and may extend into the base 36 of receptacle housing 34, as shown in FIGS. 7, 8 and 9. Preferably, contact pins 50 will be received and soldered in printed circuit barrels on printed circuit board 45 for appropriate connection to the conductive pathways on the printed circuit board. Conductive pins 50 will also extend outwardly from the board a sufficient distance and in a predetermined spaced arrangement so as to provide a series of pins adapted to be contacted by a standard sized electrical connector which serves as the means for connecting the receptacle into the aforementioned master electrical circuit or operating system by means of a conductive ribbon type lead connected to a female ribbon type connector into which arranged contact pins 50 are inserted.

As can be seen from FIG. 2, contact pins 50 may be arranged in two inner rows 51 on base support 36 and two corresponding inner rows 52 on printed circuit board 45. Alternatively, contact pins 54 (shown in FIG. 2) may be used if desired and located in outer rows 55 and 56 on base portion 36 and printed circuit board 45, respectively, to allow connection to a different sized electrical connector. It can be seen, by varying the arrangement of the contact pins, various standard sized electrical connectors can be accommodated to receive the contact pins of the receptacle. Reference may be made to FIG. 13 for an example of a specific printed circuit board arrangement.

As can be seen from the above, with spaced contact pins 40 in place and external connection pins 50 in place or the optional external connection contact pins 54 in place, key 10 may be inserted into the receptacle housing through keyway 28 and turned or rotated so as to cause the electrical contacts 16 thereof to mate with the oppositely disposed contact pins 40 in receptacle housing 34. The key has an insert position in which its contacts are angularly displaced from the receptacle contacts and a locked or contact position in contact with the receptacle contacts. Receptacle housing 34 includes, as previously noted, flange 26, which preferably carries a pair of spaced key stops 27 radially arranged about keyway opening 28 so as to allow the upright insertion of key 10 into the receptacle and rotation thereof 90° to a position in which contacts 16 on key 10 mate with contact pins 40 as best seen in FIG. 9.

However, due to the fact that contact pins 40 are exposed to potential damage by the insertion of miscellaneous objects through keyway opening 28 into the interior chamber of the receptacle, it is preferred that the receptacle include a contact pin protect sleeve or guard means, generally designated 60 in FIG. 2, further details of which are best seen in FIGS. 4, 5 and 6.

The contact pin protect sleeve or guard means 60 is a generally tubular structure of cylindrical shape preferably, although various cross-sectional shapes may be utilized so long as the structure is rotatable within the appropriate shaped chamber of receptacle housing 34. As can be seen from FIG. 2, the interior surfaces of the housing chamber are suitably curved to facilitate rotation of cylindrical guard means 60 therein. FIGS. 4, 5 and 6 should also be referred to in addition in FIG. 2 for details concerning the structure of guard means 60. From these Figures, it can be seen that the guard is formed of a plurality of discoid elements 62 concentrically spaced along a common axis and interconnected by two oppositely disposed rows of paired rib elements 64. Preferably, rib elements 64 will have inwardly tapered tops and bottoms 66 and 67. The discoid elements 62 contain aligned openings 68 which, along with the rib-like elements 64, define a keyway into which a key-like device, such as key 10, may be inserted when guard means 60 is carried within the chamber of receptacle housing 34. As can be seen from FIG. 2, guard means 60 may be inserted into the interior housing chamber by means of an opening at the distal end of housing 34. The keyway defined by discoid elements 62 and rib elements 64 has an open top and bottom between the spaced discoid elements, the sides of which are closed by rib elements 64.

As shown in FIGS. 2 and 4, one or more detent elements 70 may be carried on the periphery of discoid elements 62 and an appropriate seat 73 may be provided in housing receptacle 34 to facilitate assembly of the receptacle and to afford a positive snap-action to rotation of guard means 60 when rotated in receptacle housing 34. Preferably, detents 70 and seats 73 will be so arranged as to position the keyway of guard means 60 in a normally open or upright position, hereinafter termed the "guard" position, in which the rib elements 64 are positioned along the sides of receptacle housing 34 such that contact pins 40 lie alongside rib elements 64 which separate contact pins 40 from keyway 68, thus preventing their exposure when a key is not inserted into the receptacle. Upon insertion of a key and rotation thereof, guard means 60 rotates with the key to a position, as shown in FIG. 9, whereby contacts 16 on the key are able to contact the contact pins 40 through the open top and bottom of the keyway defined by the guard means.

The receptacle will also preferably include a switch element referred to herein as a last-on-first-off (LOFO) switch, the purpose of which is to render certain that all contact pins 40 are completely contacted by all key contacts 16 before the LOFO switch is closed, allowing electrical connection between the key contacts, the receptacle contacts and the operating circuitry. Preferably, the LOFO switch will comprise a pair of contact pins identical to pins 40 disposed at the distal end of receptacle housing 34 and a shunt in the form of a U-shaped or staple-shaped wire 75 inserted into the last pair of discoid elements 62, as shown in FIGS. 2 and 4, at the distal end of guard means 60. As can be seen in FIG. 4, the staple 75 is arranged a few degrees from vertical so as to lag behind the rotational movement of the key contacts 16 when a key is rotated in keyway 68 to contact contact pins 40 in the receptacle. Consequently, contact by legs 76 to the oppositely disposed contact pins in the receptacle will lag contact between the key contacts 16 and contact pins 40, making certain that all key/receptacle contacts are positively made before legs 76 contact the corresponding receptacle contact pins to provide electrical connection between all contacts and the operating circuit.

The last several discoid elements 62 of guard means 60 are also notched, as shown at 78 in FIGS. 2 and 4, to provide for locking of guard means 60 against rotation, if desired, by means of a suitable latching mechanism, one form of which will be described hereinbelow.

In assembling the receptacle, guard means 60 is inserted into the chamber of housing 34. Printed circuit board 45 is positioned appropriately on base 36 and contact pins 40 are staked through printed circuit board 45 and base 35 of receptacle housing 34 to extend between discoid elements 62 alongside rib elements 64 and into slots 46. Consequently, guard means 60 is held inside receptacle 34 primarily by means of staked contact pins 40. Additional contact pins 50 and 54 are also staked into printed circuit board 45 at this time and all contact pins are soldered or otherwise connected permanently to the barrels of the printed circuit board through which the pins have been staked. The guard means is positioned such that the keyway is in an upright position aligned with the keyway opening 28 and flange 26 on receptacle housing 34 with detents 70 in seats 45.

The partially assembled receptacle is then inserted into case container 20 through the opened distal end thereof, as shown in FIG. 10, with flange 26 emerging through opening 24 and bezel 22.

A closure member, generally indicated at 80 in FIGS. 10 and 11, having locking tabs 81 which fit into openings 79 on case container 20 is then locked into position to close the end of the container. Cover member 80 will preferably also include a drain pan or liquid collection member 82 and an outlet conduit 83 leading from the interior drain pan to the exterior of container 20. Consequently, any liquid, such as rain water or the like which might gain access to the receptacle or container, may be drained therefrom.

Cover member 80 also includes two support arms 84 which rest against end 35 of the receptacle housing 34 to provide internal support for the cover.

The mechanism of operation of the receptacle is as follows. When key 10 is fully inserted, it may be rotated to bring key contacts 16 into engagement with receptacle contact pins 40. As the key is rotated from the insertion position to the contacting or "locked" position, pressure on contact pins 40 displaces them outwardly as shown best in FIG. 9.

Cover member 80 also preferably includes a latch member 85 carried by a flap member 86 which is hinged at its base to the cover member, as shown at 88. Preferably, cover member 80, as well as all other component parts of the receptacle, such as guard means 60 and receptacle housing 34, will be made of non-conductive molded plastic, such as DELRIN ® acetol resin, available from E. I. DuPont deNemours Co. of Wilmington, Del. 19898, which functions well for the component parts mentioned above, as well as possesses requisite flexibility for providing hinge portions 88 which retain flexibility over a long period of life. Other plastics may be used as well. The arrangement described for latch member 85, which is normally substantially upright in the plane of the cover, allows its movement inwardly of the unit to engage notches 78 and lock guard means against rotation when desired. This may be accomplished by means of a rod 90 which may be remotely operated by any suitable arrangement, such as an electrically actuated solenoid. With such a latching mechanism in place the unit may be locked as desired. For example, the master operating circuit may be designed so as to recognize unauthorized keys, such as stolen keys or the like, when inserted into the receptacle and rotated to the contact position. Such an occurrence may be arranged to cause locking of the latch mechanism so as to prevent removal of the unauthorized key.

A specific printed circuit board arrangement is shown in FIG. 13 showing various pathways indicated at 44 which connect contact pins 40 seated in the circuit board 45 to various connector pins 50 and to LOFO contact pins 43. Ribbon-type connector 46 of standardized size may be used for electrically contacting pins 50 which are suitably arranged to mate therewith. As already pointed out, any number of contact pins arrangements may be made for the receptacle and printed circuit board.

To remove potentially interferring static electricity from the key or the bodies of users, the receptacle may be provided with optional conductive areas about the bezel which may be connected to ground. For example, entire bezel 22 or flange 26 may be made of plastic which has been filled with conductive materials, such as filled carbon black or carbon fibers. Such an arrangement provides a preferred path for the discharge of static electricity originating on the body of the user or on the key and wipes the static charge off of the key before it enters the receptacle where the static electricity might possibly discharge through the contacts and into the master control circuit.

Having described the invention, the inclusive rights thereto are set forth in the following claims:

What is claimed is:

1. An electrical receptacle which is electrically activated by insertion and rotation of an electronic key-like device having electrical contact surface areas thereon for mating with corresponding contacts in the receptacle, the receptacle comprising:

an elongate housing including a receptacle contact support portion and a slotted enclosure portion, the receptacle contact support portion and slotted enclosure portion defining an elongate interior housing chamber having an open end into which an electronic key-like device may be inserted and rotated in the chamber; and a set of spaced electrical contact pins arranged along at least one side of the chamber defining electrical contacts for the receptacle, each pin extending from the contact support portion of the housing into the housing chamber, one end thereof being fixed in the contact support and being free at the opposite end, the free ends of the pins being respectively received in a corresponding slot in the housing enclosure portion, the slots being arranged to allow unrestrained movement of the contact pins therein so that, as an inserted key-like device is rotated in the receptacle, each contact thereon is urged into engagement with a respective pin causing movement of the pins in the slots during rotation of the key-like device.

2. The receptacle of claim 1 in which the contact support portion of the housing carries a printed circuit board exteriorly thereof:

the contact pins extend through the housing and into the circuit board making electrical contact with the printed circuit pathways thereon; and there is included an electrical connector which is connected to the printed circuit pathways for electrically connecting the receptacle contact pins into an operating circuit.

3. The receptacle of claim 1 in which the contact support portion of the housing defines a base thereof and the slotted portion includes a pair of opposing sides extending from the base;

the spaced contact pins are disposed in the chamber along both sides thereof; and the slots which receive the free ends of the contact pins are correspondingly distributed along both sides at the top of the housing.

4. The receptacle of claim 3 in which:

the base of the housing carries a printed circuit board exteriorly thereof;

the contact pins extend through a pair of substantially parallel rows of holes disposed along the base of the housing and into corresponding rows of holes in the printed circuit board making electrical contact with the printed circuit pathways of the printed circuit board; and electrical connector means is connected to the printed circuit pathways for electrically connecting the receptacle contact pins into an operating circuit.

5. The receptacle of claim 4 in which

The electrical connector means includes a series of conductive pins mounted in the printed circuit board and which are electrically connected to the receptacle contact pins by means of the printed circuit pathways on the board.

6. The receptacle of claim 5 wherein the electrical connector pins extend through the board and are received by the bottom of the receptacle housing in a paired row of holes formed therein.

7. The receptacle of claim 6 wherein the paired rows of holes are disposed between the rows of receptacle contact pins.

8. The receptacle of claim 7 wherein the paired rows of holes are arranged so that the pins therein may connect to a standardized size of electrical connector.

9. The receptacle of claim 7 wherein the paired rows of holes are disposed exteriorly of the rows of receptacle contact pins.

10. The receptacle of claim 9 wherein the paired rows of holes are arranged so that the pins therein may connect to a standardized size of electrical connector.

11. The receptacle of claim 1 including last-on-first-off switch means in the housing actuable by rotation of the key-like device;

a pair of contact pins in the housing for contacting the switch means; and electrical circuit means connected to the contact pins and extending exteriorly of the receptacle for connection to an operating circuit.

12. The receptacle of claim 1 including contact pin guard means defining a keyway, the guard means being rotatably carried within the receptacle housing chamber such that the key-like device, when inserted into the contact guard means, may be rotated to cause accompanying rotation of the guard in the housing from a "guard" position to an "access" position, the guard serving as a barrier for preventing access to the pin contacts via the keyway when in the "guard" position and allowing contact of the key-like device contacts to the pins contacts when in the "access" position.

13. The receptacle of claim 12 in which the guard means comprises a tubular structure formed by:

a plurality of discoid elements concentrically spaced along a common axis;

two oppositely disposed rows of rib elements interposed between and interconnecting the discoid elements so as to provide a guard means having closed sides and an open top and bottom, the rib elements being inset relative to the edges of the discoid elements; and the receptacle contact pins are respectively positioned between the discoid elements adjacent the rib elements when the guard means is in the "guard" position and adjacent the open top and bottom when in the "access" position.

14. The receptacle of claim 13 in which the rib elements have inwardly tapered tops and bottoms.

15. The receptacle of claim 14 in which the opening into the keyway of the guard means corresponds to the cross-sectional shape of the key-like device.

16. The receptacle of claim 14 in which the end of the tubular guard means opposite the open end is substantially closed.

17. The receptacle of claim 14 in which the guard means carries a last-on-first-off switch means arranged to contact a pair of contact pins in the housing upon rotation of the guard means following contact of the key-like device with the receptacle contact pins.

18. The receptacle of claim 17 in which the switch means comprises a wire staple staked into the end of the tubular structure with the legs of the staple oriented inwardly along the key way, the staple body being so angularly positioned as to rotationally lag behind the open top and bottom of the keyway.

19. The receptacle of claim 18 in which
the contact support portion of the housing defines the base thereof and the slotted portion defines a pair of opposing sides extending from the base;
the spaced contact pins are disposed in the chamber along both sides thereof; and
the slots which receive the free ends of the contact pins are correspondingly distributed along both sides of the chamber.

20. The receptacle of claim 19 in which
the base of the housing carries a printed circuit board exteriorly thereof;
the contact pins extend through a pair of substantially parallel rows of holes disposed along the bottom of the housing and into corresponding rows of holes in the printed circuit board making electrical contact with the printed circuit pathways of the printed circuit board; and
electrical connector means is connected to the printed circuit pathways for electrically connecting the receptacle contact pins into an operating circuit.

21. The receptacle of claim 12 including detent means arranged between the guard means and interior chamber for normally retaining the guard means in the "guard" position.

22. The receptacle of claim 21 in which the detent means is arranged so as to also retain the guard means in the "access" position upon rotation thereof.

23. The receptacle of claim 13 in which the interior end of the guard means is notched and the receptacle includes a latch means insertable into the notch for locking the guard means against rotation.

24. The receptacle of claim 1 including:
a flange surrounding the opening in the housing leading to the interior chamber; and
a mounting case for the receptacle, the case comprising:
an open-ended container in which the receptacle is mounted,
a bezel carried at the front end of the container, the bezel having an access opening which receives the flange on the receptacle housing; and
a closure member at the other end of the container.

25. The receptacle of claim 24 in which the flange carries stop means on its exterior face for controlling the rotation of the key-like device.

26. The receptacle of claim 24 in which the container includes drain means for facilitating drainage of any liquid which gains entrance to the container interior.

27. The receptacle of claim 26 in which the drain means includes an interior liquid collector carried by the closure means and an outlet connecting therewith.

28. The receptacle of claim 24 in which the closure member includes an inwardly movable portion carrying the latch means for engaging the notch in the guard means and locking same against rotation.

29. The receptacle of claim 24 in which the bezel is comprised of an electricity conductive material.

30. The receptacle of claim 1 in which a flange surrounds the opening into the housing and the flange is comprised of an electricity conductive material.

* * * * *

UNITED STATES PATENT AND TRADEMARK OFFICE
CERTIFICATE OF CORRECTION

PATENT NO. : 4,620,088

DATED : October 28, 1986

INVENTOR(S) : William P. Flies

It is certified that error appears in the above-identified patent and that said Letters Patent are hereby corrected as shown below:

Col. 1, line 30, the word appearing as "eletrical" should read --electrical--.

Col. 2, line 8, the word appearing as "connection" should read --connected--.

Signed and Sealed this

Twenty-seventh Day of January, 1987

Attest:

DONALD J. QUIGG

*Attesting Officer*     *Commissioner of Patents and Trademarks*